Sept. 17, 1946.  O. HAAS  2,407,879
COMPOSITE NUT
Filed July 8, 1944
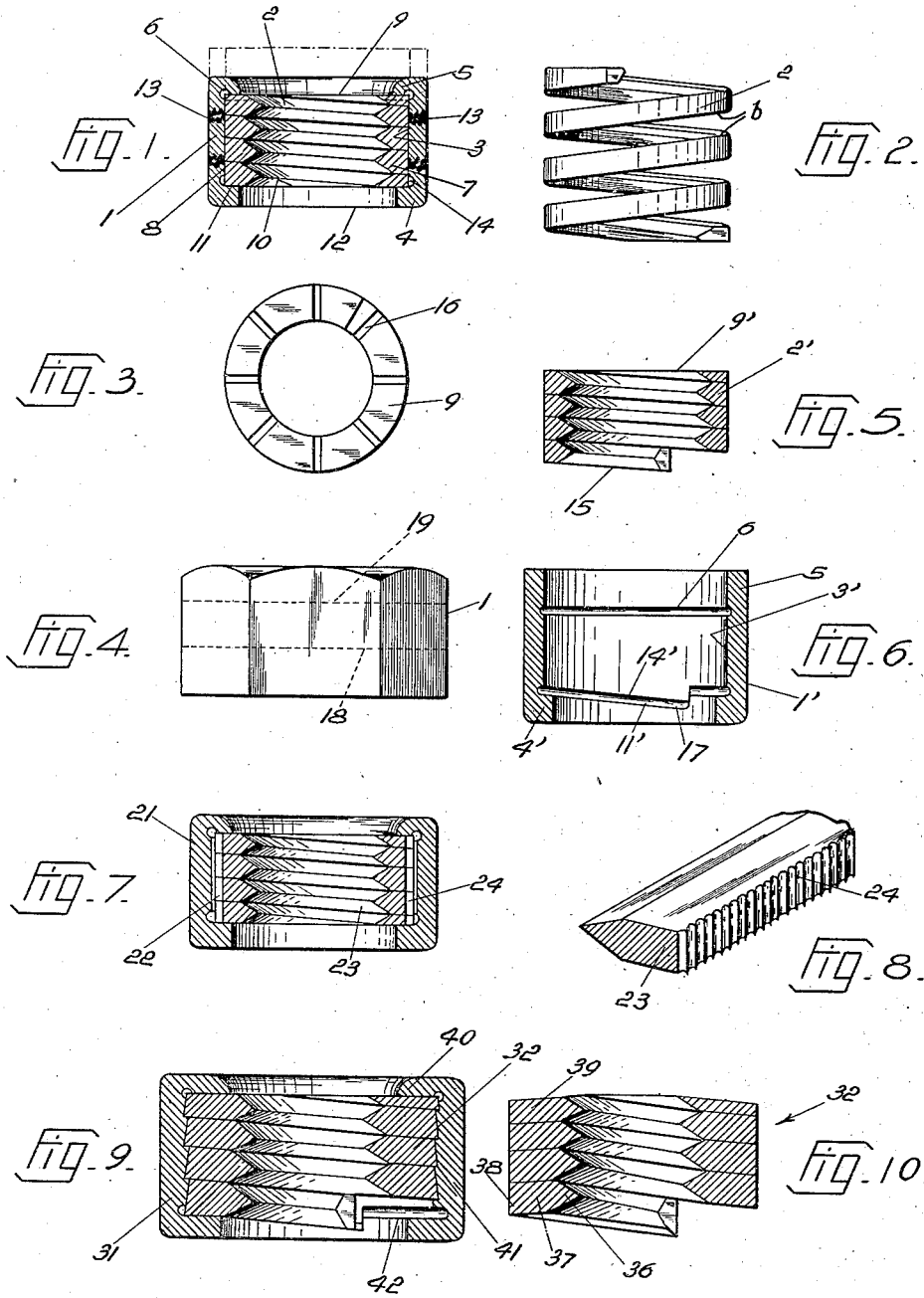
Inventor
OTTO HAAS
By Walter S. Bleston
Attorney Patented Sept. 17, 1946

2,407,879

UNITED STATES PATENT OFFICE 2,407,879

COMPOSITE NUT

Otto Haas, Richmond Hill, N. Y., assignor to Aircraft Screw Products Company, Inc., Long Island City, N. Y., a corporation of New York Application July 8, 1944, Serial No. 544,029

16 Claims. (Cl. 85—32)

The invention relates to a composite nut comprising two parts, viz. a barrel and a thread coil insert. In a nut of a type here under consideration the insert is usually coiled of an elongated metal element such as a wire and is positioned between a bottom flange and a top rim of the barrel. Both the flange and the rim protrude inwardly from the substantially cylindrical inner barrel surface, and the thread-constituting portions of the coil convolutions project inwardly beyond the innermost diameter of the flange and the rim.

In a conventional nut of the mentioned type, when in use, the entire tension of the screw connection of which the nut is a part, and which tension is the sum of the axial forces acting on all the coil convolutions, is taken up by that portion of the inwardly protruding barrel flange zone on which the coil bears. Furthermore, if the nut is applied to a bolt in an oversized hole of a member upon which the nut bears with its bottom surface it may happen that only a zone corresponding to the barrel wall cross-section is supported rather than the total bottom surface consisting of that zone plus the inwardly projecting flange. In such an event the flange will also be subject to bending and shear forces tending to squeeze flange material into the hole between the bolt and the wall of the hole. It is, of course, possible in most cases so to dimension the coil wire, the inner flange area, and the barrel in radial direction, and also the thickness of the flange in axial direction, that the occurring forces can be withstood with ordinary material. However, this would mean that in general the composite nut would have to be considerably larger than the usual one-piece nut with the result among other disadvantages that such nut would not be applicable where space is too restricted. By selecting a very high grade material of great toughness and hardness for the barrel, the dimension may be held within desirable limits. However, apart from the cost of such material, its working into a nut barrel would increase the required labor and might even render the application of certain methods of production impossible, particularly if according to a conventional method the top rim of the barrel is turned inwardly upon the top convolution of the coil after the insertion of the latter in the barrel.

The invention aims, therefore, to improve a composite nut of the mentioned type with a view to render the flanged barrel better fit to withstand the occurring stresses, and it has for an object the provision of new means and methods whereby the pressure per unit area of the barrel flange can be reduced and whereby the strength of the nut can be increased. The invention comprises a connection of the barrel wall and the insert so as to cause the barrel wall to receive and transmit to its support at least a portion of those forces which usually are borne by the flange alone. The invention also comprises other means and methods applicable additionally to or separately from the aforementioned to increase the carrying capability of the flange.

Further objects and details of the invention will be apparent from the description given hereinafter and the accompanying drawing showing several embodiments thereof by way of example.

In the drawing,

Fig. 1 is a cross-section of a nut comprising barrel and thread coil according to my invention;

Fig. 2 is a side elevation of the coil prior to its insertion into the barrel of the nut;

Fig. 3 is a top plan view of the coil;

Fig. 4 is a side elevation of the nut of Fig. 1;

Fig. 5 is a cross-section of a modified thread coil separate from the barrel;

Fig. 6 is a cross-section of a modified barrel for use with the coil of Fig. 5 prior to its insertion;

Fig. 7 is a cross-section of another modified nut;

Fig. 8 is a perspective view of a portion of a wire prior to being wound into the thread coil of Fig. 7;

Fig. 9 is a cross-section of still another modification; and

Fig. 10 is a cross-section of the thread coil according to Fig. 9 prior to its insertion into the nut barrel.

Referring now to the drawing, Figs. 1 to 4 illustrate a nut according to the invention and consisting of the barrel 1 and the thread coil or insert 2. The barrel has an interior cylindrical surface 3 and is provided with an inner bottom flange 4 and a top rim 5 turned down from its original position indicated by dotted lines upon the top convolution of the insert 2 after the latter has been inserted into the barrel.

A groove 6 is provided at the upper top corner where the rim 5 is turned over to press the coil against the bottom flange 4. Such a groove is provided in order to facilitate the turning over of the rim in a proper manner, since otherwise there is a danger of the top convolution being forced radially inward whereby the inner diameter of the latter might be undesirably restricted. Of course, a similar result may be obtained if groove 6 is omitted and the entire rim-forming portion of the barrel is originally provided with an inner diameter larger than that of the coilreceiving portion. The peripheral surface of the nut barrel may have any suitable and conventional shape, and may for instance be hexagoal as indicated in Fig. 4.

The insert 2 has an outer cylindrical surface, the diameter of which is substantially equal to that of the barrel surface 3. It is formed of a wire or cut from a cylinder as e. g. disclosed in my Patent Number 2,358,707, issued September 19, 1944. The cross-section of the convolutions is to be selected according to the type and size of the bolt threading for which the nut is destined and according to the load to which the nut is to be subjected. In the illustrated example, the cross-section of a convolution consists of an inner triangular portion 7 for engagement with the thread groove of a conventional V-threading, and of a rectangular outer portion 8 on which the triangle is erected and which engages the cylindrical surface 3 when the coil is inserted in the barrel. The coil convolutions bear one upon the other with the rectangular portions of their cross-sections and the top and bottom surfaces 9 and 10 respectively of the coil may be plane, i. e. at right angles to the nut axis $a$. The tri-angular portions 7 of the convolutions project inwardly from the rim and the bottom so that they may be engaged by the threading of a bolt (not shown).

Now it will be clear that if the nut is used in a screw connection, the load of the connection will be transmitted through the coil convolutions to the flange 4 upon the top surface 11 of which the convolutions bear with a more or less considerable pressure per unit area. The pressure can be reduced if according to the invention the coil convolutions are bonded to the barrel wall with or without the aid of additional means, so that at least a portion of the axial force will be directly transmitted from the coil to said wall. In my aforementioned application a way leading in this direction has been indicated. It consists in that the coil is originally produced with a diameter according to that of the inner barrel surface 3, but with gaps $b$ between the convolutions as shown in Fig. 2. The coil is inserted into the barrel while the top rim 5 is in erected position. Then the coil is subjected to an axial compression sufficiently high to force the convolutions into contact with each other. Thereupon, i. e. while the coil is thus compressed, the top rim is swaged or otherwise tilted down so as to hold the coil permanently in its compressed state. The occurring reduction of the total coil length is accompanied with an increase of the coil diameter so that the convolutions exercise a strong radial pressure on the barrel wall. The resulting high friction acts as a bond between the coil and the barrel wall in axial as well as in circumferential direction with the effect that a considerable axial load will be directly transmitted from the one to the other. In consequence, a portion of the bottom face 12 of the barrel outside the ring zone corresponding to the width of the flange will contribute to transmit forces to the top surface of the member on which the nut in use comes to bear, and relieve the top flange surface accordingly.

The effectiveness of the measure described can be increased when a portion of the torque to be transmitted between the two elements of the nut is taken up by other means. For this purpose, the top surface of the coil may be provided with indentations, roughening or grooves 16 as clearly shown in Fig. 3, so that material of the barrel rim is forced into such groove by the mentioned swaging operation.

Although, as stated hereinbefore, very considerable frictional forces can be set up between the coil and the barrel wall, in certain instances it may be found rather difficult to apply to the coil an axial compression as high as may be desirable for the indicated purpose without preloading the barrel flange surface to an inadmissible extent. In other words, in order to prevent such axial compression from affecting the flange and, particularly, its top surface 10, it may be necessary to apply the compressing force to the thread-forming portion 7 of the coil convolutions rather than to the outer portions of the convolutions. This, however, involves the danger of overloading the threading. Obviously, there is a certain relationship between the axial force required to close the original gaps between the convolutions on the one hand, and the width $b$ of the gaps on the other hand. Hence, it may be preferable to make the gaps originally smaller than necessary to set up a friction as high as otherwise desirable and to substitute for the balance by additional means for bonding the coil to the barrel wall. For this purpose, in the embodiment of Fig. 1, the coil is spot-welded at various points of the circumference to the barrel as indicated at 13. It will be clear that it is also possible to do without any axial compression of the coil for the purpose of setting up high friction between the coil and barrel, and to rely entirely on such other bonding means. In other words, the coil may be made fitting the barrel and without any gaps $b$ from the start, that means in the final form of Fig. 1, and may then be spot-welded to the barrel. In this manner also a sufficiently large portion of the axial forces may be directly transmitted from the coil convolutions to the barrel wall, to reduce the pressure acting on the flange surface.

Similarly, it is possible to make the coil in the form last described but with roughenings, indentations or grooves 16 to be engaged by material of the swaged top rim of the barrel. If such nut is applied to a bolt and particularly a tight fitting bolt, the initial torque will be transmitted between barrel and coil so that the threads of the bolt can enter the nut threading. The bolt, however, will exercise a wedging action on the engaged coil convolutions with the result that the latter are radially expanded, whereby friction will be set up of a quality similar to that obtained by the aforedescribed axial compression of the coil. Hence, also in this manner a portion of the load can be taken up by the barrel wall to release the load on the flange.

From the viewpoint of minimum pressure per unit area of the flange surface which in a composite nut of practical dimensions will be always relatively very small, it is of great importance that the coil bears uniformly on the largest possible portion of the available surface, the ideal which usually cannot be reached being that the total flange surface is engaged by the bottom face of the coil. Now I found that it is extremely difficult to make the corner between the barrel wall and the top surface of the flange exactly fitting the shape of the outer bottom corner or edge of the insert coil. Occurring differences, however, between the top corners will prevent the lowermost coil convolution from correctly seating on the top surface of the flange and consequently will cause local overload of the flange at such limited spots where the coil actually bears on that surface. In order to avoid such happening, I apply a narrow peripheral groove 14 similar to the mentioned groove 6 also at the edge formed by the barrel wall and the top flange surface. With respect to groove 14 it is essential that it extends in width upwards exactly from the plane of the top surface of the flange, and it should be as narrow and shallow as possible in view of its purpose. This groove will safeguard that the coil can flatly seat with its entire lower surface on the top surface of the flange, and that substantially the entire flange surface can contribute in supporting the axial load transmitted by the coil convolutions.

In the modified form of coil and barrel illustrated in Figs. 5 and 6 prior to the assembling, coil 2' has a plane top face 9' but a helically curved bottom face 15. Accordingly barrel 1' has a bottom flange 4' with a correspondingly shaped helical top surface 11' so that the coil can snugly engage at least a substantial portion thereof. In the event of such structure the groove 14' between the flange 4' and the side wall of the barrel should exactly follow the helical contour of the top surface 11' of the flange as clearly shown in Fig. 4.

The helical surface 11' can be produced in various manners, e. g. by a cutting or tapping operation whereby the material originally complementing the flange 4' to one of equal thickness is removed. However, in consideration of what has been said hereinbefore, it is preferable to provide the helical surface by a process wherein the flange of originally equal thickness is subjected to compression with the aid of a punch or die which has a correspondingly curved working surface and is applied interiorly of the barrel to the top surface of the flange. If this is done the desired shape of the surface 11' will not only be produced but also the material of the flange will be densified so as to withstand a greater load and particularly a greater pressure per unit area. It will be clear that in order to increase this desirable result the flange may originally be of a thickness larger than that of the thickest flange portion in the finished barrel. It will also be clear that the method of compressing the flange material in order to increase its resistance to occurring stresses may as well be applied to a barrel in which the flange in its finished form is of uniform thickness such as the flange 4 in Fig. 1.

In the foregoing, the occurrence of undesirably high stresses has been considered only so far as they may affect the barrel flange. However, the stresses to which the barrel wall is subjected must be likewise taken into account. In this respect, it will be noticed that considerable radial forces may act on the barrel wall owing to the fact that a bolt engaging the nut threading will exercise a wedging action on the coil convolutions tending to expand the latter. Thus the barrel may be subjected to radial pressure no matter whether or not the coil was originally inserted under axial compression as hereinbefore mentioned. In addition thereto, the axial forces have to be taken into account which are to be transmitted by the barrel wall in relieving the flange from part of its load and which increase progressively from the top towards the bottom of the nut. In order to take care of the combined stresses acting on barrel wall and flange in a high strength composite nut while still keeping the radial dimensions in desirably low limits, a remedy would seem to consist in the selection of a higher grade material for the barrel. However, as stated hereinbefore, it is not advisable to use a barrel material which is very hard and tough, because of the requirement of turning the top rim of the barrel over upon the inserted coil. Neither is it advisable to select a material to be hardened after the nut is otherwise completed, because such hardening process would be apt to destroy the required qualities of the coil insert. For this reason, and this is also part of my invention, I make the barrel preferably of a material which can be hardened, and subject the lower portion of the barrel prior to the insertion of the coil, that means while the top rim portion is still in erected position, to a hardening process, leaving the top portion and particularly that portion which is intended to form the top rim, in its original non-hardened condition. Thereafter, the coil may be inserted and the top rim turned down as hereinbefore described. Even if it is desired only to strengthen the flange portion of the barrel regardless of the lower wall portion, the densifying of this material by local hardening is preferable to the aforementioned densifying or strengthening of the material by compression, particularly in the event of helical flange surfaces such as 11', because of the differences in the grade of compression between the lower and the higher portions of the flange on both sides of the step at 17 in Fig. 6. Of course, it is also possible first to densify the flange material by compression and then, i. e. additionally, to apply the local hardening as described. In hardening the barrel it is recommended to provide between the hardened bottom and the soft top, a zone in which the degree of hardness progressively decreases from the hardest to the softest. In other words, the highest degree of hardness should extend from the bottom surface of the barrel to approximately the thickness of one or two convolutions above the flange, as indicated by the dotted line 18 in Fig. 4. This will take care of the maximum forces acting on the barrel wall and simultaneously provide for a flange capable of withstanding high pressure per unit area. In a middle zone approximately according to that between lines 18 to 19 of Fig. 4, the hardness should progressively decrease to the original relative softness of the material above the line 19. This is consistent with the decrease of the forces acting on the barrel wall and which increase from the level of the top of the coil to the level of the flange. The gradual change of the structure of the material in the middle zone also reduces the danger of a formation of cracks or fissures or of deformations of the barrel owing to the hardening treatment. Otherwise the hardening may be accomplished by any suitable and conventional process. In order to obtain the desired result, I have found the well known method of induction hardening particularly useful.

Figs. 7 and 8 illustrate another method of closely attaching the insert to the barrel. In this modification the inner wall of the barrel 21 is provided with serrations 22, and the wire coil insert 23 is provided with corresponding serrations 24 which may be produced either in the otherwise finished coil or in the straight wire prior to the coiling. The serrations may be either axially directed or helically arranged with a very large pitch. They may be more in the character of roughenings than of relatively large teeth shown in Fig. 8 illustrating a serrated piece of wire and where the serrations are rather exaggerated for sake of a clearer illustration. Neither is it essential that the serrations of the wire when coiled are perfectly aligned from convolution to convolution, or that the serrations of the one part exactly intermesh with those of the other. On the contrary, certain irregularities may even be desirable, so that when the coil is forcibly inserted into the barrel the serrations or projections interlock rather than intermesh. In other respects, the nut of Fig. 7 is similar to that of Fig. 1.

A third manner in which load forces may be directly transmitted from the insert to the barrel wall is illustrated by Figs. 9 and 10. In this case, the barrel 31 is originally made according to the shape of Fig. 6, that means with a smooth cylindrical inner surface. The insert 32 is produced of a wire the cross-section of which differs from the insert 2 of Fig. 1 in that a triangular portion 36 is based on a trapezoidal portion 37, the outer side 38 including other than rectangles with the adjacent sides. The wire is so coiled that the outer faces of the convolutions constitute a cylinder which fits into the aforementioned barrel cylinder, and that the top face 39 is slightly conically raised as clearly shown in Fig. 10. The so shaped wire coil is inserted in the barrel. If now, the top rim 40 is turned down upon the face 39 under application of pressure each convolution cross-section will tend to turn about its lower outside corner, so that the edges on which these corners are located will dig into the side wall of the barrel as indicated at 41. This requires, of course, that the wire is, as in most cases, of a material harder than that of the barrel. It will be noticed that the groove thus produced in the interior of the barrel has the shape of a saw-tooth screw thread. It differs, however, from a threading provided in a conventional manner in that it is not formed by tapping and that the coil convolutions fit into the groove with an exactness which could not be obtained if the barrel groove and the mating coil portion were separately produced and the parts, then, screwed together. In the modification just described a groove 42 following the curve of the bottom flange may be provided in the barrel similarly to the groove 14' of Fig. 6. This groove will facilitate the tilting of the lowermost coil convolution so that the bottom face of the latter will safely settle on the top surface of the bottom flange. It will also be noted that the groove 41 in the finished nut will form a continuation of the groove 42.

The nut according to my invention is particularly well adapted to be used as a lock nut. For this purpose, the coil may be made of a wire which varies as to its cross-sectional dimensions either throughout its length or through only part of its length. This is also shown in Fig. 9. In the illustrated embodiment, the cross-section of the wire of the coil 32 decreases in size in axial direction from the lower end towards the upper end of the coil whereby the pitch decreases. Furthermore, the size of the wire cross-section in radial direction increases from the lower end towards the top end whereby the thread diameter decreases towards the top. The change of the cross-sectional size of the wire may be applied in one direction only or in both simultaneously, since either one of the mentioned changes will have a locking effect on a bolt on which the nut may be screwed.

It will be clear that other coil forms or other means may also be applied to the nut according to the invention in order to obtain a desired locking effect.

It will be apparent to those skilled in the art that many alterations and modifications of the nut described and illustrated by way of example may be made without departing from my invention which is not limited by the particular disclosure of the embodiments thereof but by the scope of the appended claims.

I claim:
1. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, said coil convolutions being bonded to the wall of said barrel intermediate the ends of the coil.

2. A composite nut comprising a barrel having an inner cylindrical surface and including an interiorly projecting bottom flange and a top rim, and a helical coil spring originally having spaced convolutions of a cross-section consisting of an outer rectangular portion and an inner portion of a shape according to the threading for the engagement of which the nut is destined, said coil being located interiorly of said barrel and being in an axially compressed state between said flange and said top rim, said top rim being turned inwardly upon said coil, the convolutions of said coil bearing with said rectangular portions one upon another and being radially pressed against said inner surface of said barrel owing to said axial compression.

3. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, said coil convolutions being spot-welded to the wall of said barrel at a plurality of points intermediate the ends of the coil.

4. A nut comprising a barrel with a cylindrical inner surface and embodying a top rim and a bottom flange both inwardly projecting, and a helical coil clamped between said rim and said flange and having screw-thread-forming portions of its convolutions projecting inwardly from said rim and said flange, the top surface of said coil being provided with indentations and material of said top rim being in engagement with said indentations.

5. A nut comprising a barrel with a substantially cylindrical and substantially lengthwise serrated inner surface and embodying a top rim and a bottom flange both inwardly projecting, and an exteriorly serrated helical coil between said rim and said flange so as to engage with its serrations those of said barrel and having screw-thread-forming portions of its convolutions projecting inwardly from said rim and said flange.

6. A nut comprising a barrel with a substantially cylindrical and substantially lengthwise serrated inner surface and embodying a top rim and a bottom flange both inwardly projecting, and a helical coil wound of wire having an outer serrated face, said coil being between said rim and said flange so as to engage with its serrations those of said barrel and having screw-thread-forming portions of its convolutions projecting inwardly from said rim and said flange.

7. A nut comprising a barrel with a cylindrical inner surface and embodying a top rim and a bottom flange both inwardly projecting, and a helical coil interiorly of said barrel between said rim and said flange, the cross-sections of the convolutions of said coil having an outer trapezoidal portion and an inner triangular portion, said coil being originally so wound that the outer sides of said trapezoidal portions constitute a cylinder, the rim of the barrel being forcibly turned down upon the top of said coil after the insertion of the coil in the barrel, and the outer lower edges of the coil convolutions being embedded in the barrel side wall owing to the pressure exerted by the rim on the coil.

8. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, and said barrel being provided on its inside with a narrow and shallow groove extending as to its width from the top surface of said flange upwards and running along said surface.

9. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, said flange having a helically curved top surface of a shape according to the bottom face of said coil, and said barrel being provided on its inside with a narrow and shallow helical groove extending as to its width from the top surface of said flange upwards and running along said surface.

10. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, the material of the flanged barrel portion being of denser structure than the material of a portion on a level of the barrel above said flange.

11. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, said barrel being of a material susceptible to a hardening treatment and its flanged portion being hardened prior to the insertion of said coil.

12. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, said barrel being of a material susceptible to a hardening treatment and having a hardened bottom portion, a relatively soft top portion, and a median portion progressing in hardness from the softness of the top portion to the hardness of the bottom portion.

13. A nut comprising a barrel with a cylindrical inner surface and embodying a top rim and a bottom flange both inwardly projecting, and a helical coil between said rim and said flange and having screw-thread-forming portions of its convolutions projecting inwardly from said rim and said flange, said coil having a helically curved bottom face and said flange having a helically curved top surface of a shape according to the bottom face of said coil, said barrel being of a material susceptible to a hardening treatment and being provided on its inside with a narrow and shallow helical groove extending as to its width from the top surface of said flange upwards and running along said surface, and the flanged barrel portion being hardened prior to the insertion of said coil.

14. A nut comprising a barrel with a cylindrical surface and embodying a top rim and a bottom flange both inwardly projecting, and a helical wire coil clamped between said rim and said flange and having screw-thread-forming portions of its convolutions projecting inwardly from said rim and said flange, the wire of which said coil is wound, tapering in at least one of its cross-sectional dimensions through at least a portion of its length.

15. A nut as claimed in claim 14 wherein said wire tapers in one cross-sectional dimension in a direction from the top of the nut towards the bottom and in another cross-sectional dimension in the opposite direction.

16. A nut comprising a casing having a cylindrical inner surface and having inwardly projecting integral top and bottom flanges, and a resilient helical coil between said flanges and having screw thread-forming portions on the inside and projecting inwardly relative to said flanges, the material of the casing which forms the bottom flange and the zone adjacent thereto being of denser structure than the material of the casing above the bottom flange.

OTTO HAAS.